3,348,959
PROCESS FOR PREPARING SURFACE-TREATED PIGMENTS
Lajos Csonka, 14 Pazsit utca; János Szerecz, 35a Csalan utca; and Jenö Gönczy, 34 Csalan utca, all of Budapest, Hungary
No Drawing. Filed Dec. 30, 1963, Ser. No. 334,561
Claims priority, application Hungary, Jan. 2, 1963, CO–152
2 Claims. (Cl. 106—308)

This invention relates to a process for preparing surface treated pigments easily dispersible in organic solvents, lacquers and synthetic materials, by providing the surface of the pigments with an organophilic layer.

It is known that pigments which are easily wetted by and dispersible in organic liquids can be prepared by subjecting the aqueous suspension of the pigment to the effect of certain anion-active or cation-active substances having an apolar radical. Although the organophilic pigments thus obtained can be advantageously used for pigmenting synthetic resin solutions employed in the lacquer and printing industries, they can be dispered in other synthetic resins at most in the same or in a smaller degree as the untreated pigments; thus, in thermoplastic synthetic resins, e.g. in polyvinyl chloride, polyethylene, polystyrene, polyamides, polyurethane, polycarbonate etc., their dispersibility is in many cases worse and by no means better than that of the untreated pigments.

The object of the invention is the preparation of surface-treated pigments which make it possible to eliminate the disadvantageous properties of the pigments treated by the processes known hitherto and to uniformly disperse the pigments in any kind of synthetic resin.

During previous investigations it has been stated that the dispersibility of the pigments in synthetic resins and the stability of the homogeneous distribution of the dispersed pigments decisively depend on the surface properties of the pigments and the chemical composition of the synthetic material, and differences in this respect considerably influence the interaction between the pigment and the binding material. If the pigment is easily wetted by the binding material, then on the surface of the pigment an adsorption layer can be formed and thereby the dispersibility and the stability as well as the chemical and physical properties of the coating or of other laminar or fibrillar systems formed by the binding material and the pigment are improved. It has been established that the wettability between the pigment and the binding material can be considerably improved by the adsorbed-chemisorbed layer which had been formed in advance on the surface of the pigment.

It is known that in an aqueous suspension of inorganic pigments, on the surface of the pigment an electric double layer consisting of ions is formed; the inner armature of which gives the charge of the pigment particle, and accordingly the pigment may have a positive or negative surface charge. It is also known that the character of the charge of the pigment depends on the circumstances of the preparation, and correspondingly the same pigment may have a positive or negative charge. Thus, e.g. the barium sulfate precipitated in the presence of an excess of barium ions has positive charges while that precipitated in the presence of an excess of sulfate ions has negative charges. Namely, the ions present in the solution are not adsorbed in the same degree by the surface of the pigment but those ions, and primarily the own ions, are most strongly bound with which one of the ions of the pigment gives the most insoluble compound. If the reagents are mixed in stoichiometeric ratio, then the aqueous solution is free from ions, but even in this case an electric double layer is formed because the pigment being in contact with water undergoes a surface dissociation, and the inner armature is given by the ion having a smaller chemical potential, that is the charge of the pigment surface is determined by this ion, and the exterior armature is formed by the ion having a larger chemical potential. In such a case the barium-sulfate pigment will have positive charges because the chemical potential of the sulfate ion is higher than that of the barium ion.

Furthermore, e.g. the cadmium sulfide pigment prepared with an excess of cadmium ions has positive charges and that prepared with an excess of sulfide ions has negative charges. When the reagents are mixed in stoichiometric ratio then, due to hydration and dissociation of the surface in contact with water, the cadmium sulfide will have negative charges. Besides its own ions and similar ions, the character of the charge of the pigment can be influenced by other ions too, namely in a degree increasing with the increase of the valency of the ion.

The invention is based on the recognition that pigments easily dispersible even in organic synthetic materials can be prepared by reacting an aqueous suspension of the pigment with an aqueous solution of the alkali or ammonium salts of anion-active agents of acid character or of the salts soluble in water of cation-active -onion and -inium organic bases, respectively, furthermore with an aqueous solution of the salts soluble in water of bi-, tri- or tetravalent metals, as well as with the aqueous solution of alkali-hydroxo complex salts, alkali borates, or boric acid. A further basis of the invention is the recognition that pigments having positive surface charges can be excellently rendered organophilic also without the addition of alkali-hydroxo complex salts, alkali borates or boric acid, by treating the pigment with an aqueous solution of an alkali or ammonium salt of an anion-active agent of the group consisting of aromatic, hydroaromatic or arylated aliphatic monocarboxylic acids, alkoxo acids of alkyl borates, and semiesters and N-alkyl-semiamide derivatives of di- and polycarboxylic acids, and with an aqueous solution of salts soluble in water of di-, tri- or tetravalent metals. Finally, the basis of the invention is the recognition that in the latter case, that is when treating pigments having positive surface charges, the use of metallic salts is also unnecessary if the cation of the inner armature of the electric double layer developed on the surface of the pigment forms an insoluble precipitate with the anion-active agent.

The invention is a process for preparing surface-treated pigments having positive surface charges and being easily dispersible in organic solvents, lacquers and synthetic materials, by providing the surface of the pigments with an organophilic layer, in which the aqueous suspension of the pigment is treated with a 1 to 5% by weight aqueous solution of 0.1 to 30% by weight, based on the pigment weight, of a member selected from the group consisting of alkali and ammonium salts of saturated, unsaturated and polymerized aliphatic, arylated aliphatic, aromatic and hydroaromatic carboxylic acids containing at least 6 carbon atoms, the alkyl-, aryl- and mixed alkyl-aryl sulfonates, sulfates, phosphates and polyphosphates, the condensation products of alkyloxy-, aryloxy- and amino-sulfonic acids with fatty acids containing from 8 to 18 carbon atoms, the sulfonated derivatives of condensation products of fatty acids containing from 8 to 18 carbon atoms with aromatic diamines, the semiesters and N-alkyl-semiamide derivatives of aliphatic, arylated aliphatic, aromatic and hydroaromatic dicarboxylic and polycarboxylic acids, alkoxo acids of alkyl borates, and mixtures thereof, furthermore with a 0.1 to 2 N aqueous solution of 0.05 to 5% by weight, based on the pigment weight, of a member selected from the group consisting of boric acid, alkali borates, alkali hydroxo complex salts, and mixtures thereof, the said alkali hydroxo complex salts being selected from the group consisting of alkali stannates, alkali antimonites, alkali antimonates, alkali arsenites, alkali arsenates, alkali aluminates, alkali zincates, alkali plumbites, and alkali chromites, moreover with the 0.1 to 2 N aqueous solution of 1 to 2 equivalents, based on the amount of the boric acid, alkali borates and alkali hydroxo complex salts, of salts soluble in water of cations selected from the group consisting of lead, mercury, copper, cadmium, tin (II), cobalt, nickel, ferrous, zinc, manganese, magnesium, calcium, strontium, barium, ferric, chromium, aluminum, tin (IV), titanium and mixtures thereof, whereafter the pigment is separated from the aqueous solution.

Another method for rendering organophilic the pigments having positive surface charges by the process according to the invention in the case when the cation of the inner armature of the electric double layer formed on the positively charged surface of the pigment forms an insoluble precipitate with the anion-active agent, consists in treating an aqueous suspension of the pigment with a 1 to 5% by weight aqueous solution of 0.1 to 30% by weight, based on the pigment weight, of a member selected from the group consisting of alkali and ammonium salts of semiesters and N-alkyl-semiamide derivatives of aliphatic, arylated-aliphatic, aromatic and hydroaromatic dicarboxylic and polycarboxylic acids, alkali and ammonium salts of aromatic, hydroaromatic, and arylated aliphatic monocarboxylic acids, alkali and ammonium salts of the alkoxo acids of alkyl borates, and mixtures thereof, whereafter the pigment is separated from the aqueous solution.

If the cation of the inner armature of the electric double layer formed on the positively charged pigment surface does not form an insoluble precipitate with the anion-active agent then, in addition to the aqueous solution of the above-enumerated anion-active agents, a 0.1 to 2 N aqueous solution of 1 to 1.5 equivalents, based on the amount of the anion-active agent, of salts soluble in water of cations selected from the group consisting of lead, mercury, copper, cadmium, stanno, cobalt, nickel, ferrous, zinc, manganese, magnesium, calcium, strontium, barium, ferric, chromium, aluminum, stanni, titanium, and mixtures thereof has to be also employed for the organophilization of the pigment.

In compliance with the process according to the invention, the following compounds can be advantageously used as the alkali or ammonium salts of saturated, unsaturated and/or polymerized aliphatic, arylated aliphatic aromatic and/or hydroaromatic carboxylic acids containing at least 6 carbon atoms: stearates, ricinoleates, capronates, phenylglycolates, p-isopropyl benzoates, hexachloronaphthoates, p-isopropyl-hexahydro benzoates, salts of boiled linseed oil, etc.

The following compounds may be advantageously used as alkyl, aryl and/or mixed alkyl-aryl sulfonates, sulfates, phosphates and/or polyphosphates: dodecyl sulfonates, cetyl sulfonates, benzene sulfonates, isopropyl-naphthalene sulfonates, alkyl-naphthalene sulfonates (the product to be commercially available with the trade mark "Nekal"), phenol sulfonates, naphthol sulfonates, p-isopropyl benzoates, hexachloro-naphthoates, p-isopropyl hexahydro benzoates, cetyl phosphates, dilauryl pyrophosphates, etc.

The following compounds may be advantageously used as condensation products of alkyloxy, aryloxy and/or aminosulfonic acids with fatty acids: oleates of isethionic acid (the product commercially available under the trade mark "Igepon A"), oleates of alkyl-amino-ethane-sulfonic acid (the product commercially available under the trade mark "Igepon T"), etc.

As sulfonated derivatives of the condensation products of fatty acids and aromatic diamines: benzimidazol sulfonates of heptadecylic acid (the product commercially available under the trade mark "Ultravon") may be advantageously used.

The following compounds may be advantageously used as alkali or ammonium salts of semiesters or N-alkyl-semiamide derivatives of aliphatic, arylated, aliphatic, aromatic and/or hydroaromatic di- and polycarboxylic acids: the ammonium salt of mononoyl ester of succinic acid, sodium salt of monolauryl ester of hydroxy-succinic acid, ammonium salt of dioctyl tricarballylic acid, didecyl ammonium citrate, dioctyl ammonium aconitate, ammonium salt of the diester of tricarballylic acid and glycolchlorohydrine laurylalcohol, sodium salt of mono-N-octyl adipinic acid amide, monobutyl ammonium phthalate, monodecyl ammonium diphenate, dioctyl ammonium trimellitate, butyl stearyl ammonium pyromellitate, ammonium salt of the monooctyl ester of hexachloro-endo-methylene tetrahydrophthalic acid, ammonium salt of monoglycolchlorohydrine ester of naphthalic acid, sodium salt of N-dilauryl phthalic acid amide, ammonium phenyl glycolate, monooctyl ammonium hydrophthalate, monolauryl ammonium phenylene diacetate, etc.

The alkali salts of bis-diol-boric acid esters formed from compounds containing vicinal dioles may be advantageously used as the alkoxo acid salts formed by the reaction of alkyl borates and alcohols.

In compliance with the process according to the invention, pigments having negative surface charges may be rendered organophilic and thereby easily dispersible in organic solvents, lacquers and synthetic materials, by a process, in which an aqueous suspension of the pigment is treated with a 1 to 5% by weight aqueous solution of 0.1 to 30% by weight, based on the pigment weight, of a salt soluble in water of organic bases containing an alkyl substituent having from 8 to 18 carbon atoms, furthermore with a 0.1 to 2 N aqueous solution of 0.5 to 5% by weight, based on the pigment weight, of a member selected from the group consisting of boric acid, alkali borates, alkali hydroxo complex salts, and mixtures thereof, the said alkali hydroxo complex salts being selected from the group consisting of alkali stannates, alkali antimonites, alkali antimonates, alkali arsenites, alkali arsenates, alkali aluminates, alkali zincates, alkali plumbites, and alkali chromites, moreover with a 0.1 to 2 N aqueous solution of 1 to 2 equivalents, based on the amount of the boric acid, alkali borates and alkali hydroxo complex salts, of salts soluble in water of cations selected from the group consisting of lead, mercury, copper, cadmium, tin (II), cobalt, nickel, ferrous, zinc, manganese, magnesium, calcium, strontium, barium, ferric, chromium, aluminum, tin (IV), titanium, and mixtures thereof, whereafter the pigment is separated from the aqueous solution.

As the water-soluble salts of organic bases containing an alkyl substituent having from 8 to 18 carbon atoms, cation-active -onium and -inium organic bases, such as quaternary alkyl-ammonium salts, alkyl-pyridinium salts, quaternary alkyl-phosphonium salts, quaternary alkyl-arsonium salts, and alkyl-sulfonium salts, e.g. dicetyl dimethyl ammonium bromide, dodecyl pyridinum chloride, triphenyl dodecyl phosphonium bromide, dimethyl dioctadecyl arsonium iodide, didodecyl ethyl sulfonium bromide, etc. may be advantageously used.

When choosing the metal salt, it is desirable to take into consideration also the colour of the precipitate formed by the metal salt. It is advantageous if the metal salt is related to or identical with the cation of the pigment. It is also advantageous to choose a metal salt which forms a flocculent, voluminous precipitate with the alkalihydroxo complex salt, alkali borate and/or boric acid.

The general procedure in treating pigments by the process according to the invention is to add to the aqueous suspension of the advantageously freshly precipitated and washed, and possibly finely ground pigment the aqueous solution of the alkalihydroxo complex salt, alkali borate and/or boric acid, then the aqueous solution of the salts soluble in water of bi-, tri- or tetravalent metals. In this way an insoluble amorphous precipitate is formed on the surface of the pigment, and depending on the thus-developed surface charge of the pigment, a 1–5% aqueous solution of the anion-active agent having acid character or of the cation-active organic basis is added to 40 to 100° C., preferably at 70 to 80°.

Another method for rendering pigments organophilic by the process according to the invention consists in adding the aqueous solution of the alkalihydroxo complex salt, alkali borate and/or boric acid to the aqueous suspension of the pigment, and then adding the aqueous solution of the anion-active or cation-active agent, while the aqueous solution of the bi-, tri- or tetravalent metals is only thereafter added to the system.

Hereupon the pigment precipitated from the aqueous suspension is filtered, then washed, if desired, dried at 70 to 150° C. and disintegrated, if desired.

The essence of the process taking place when carrying out the process according to the invention is that the ions of the organic surface-active agent having a charge opposed to that of the pigment surface are orientedly adsorbed by the so-called active sites of the pigment particles, and through chemisorption they are irreversibly bound by electrostatic forces in a manner so that the more apolar radical of the asymmetrically polar organic ion is oriented in the direction of the dispersing medium. Consequently, the pigment particles coagulate in and precipitate from the suspension. During the subsequent drying, the surface layer having an oriented structure is practically irreversibly bound, whereby the surface of the pigment is rendered organophilic, that is the pigments being originally moistened by water become easily wettable by organic media.

To further illustrate the process according to the invention the following examples are given. For the sake of clarity it is mentioned in advance that the executional methods described in the examples may be used not only in the case of the pigments mentioned in the examples but also in the care of other pigments of any kind as well.

If not otherwise mentioned, the solutions employed are aqueous solutions.

*Example 1*

500 g. of titanium dioxide are suspended in 2 litres of water. While intensively stirring, 10 ml. of a normal solution of sodium tetraborate and then, after some minutes, 1 litre of a 1% solution having a temperature of 60° to 80° C. of ammonium stearate are added. After intensive stirring for 10 minutes, 15 ml. of a normal titanium-sulfate solution are added. After 15 minutes, the precipitated substance is filtered, washed twice with water, then dried at a temperature of 100° to 150° C. until free from water. The titanium dioxide obtained in this way has hydrophobic properties, can be easily dispersed in synthetic materials and gives a stable suspension therein, with improved colouring strength and covering power, without becoming chalky.

*Example 2*

One proceeds as described in Example 1 with the difference that instead of the normal solution of sodium tetraborate and the 1% solution of ammonium stearate (a) 10 ml. of a freshly prepared normal solution of sodium hexahydroxo stannate and 1 litre of a 1% solution of the ammonium salt of a polymerized fatty acid (e.g. boiled linseed oil), and instead of the 15 ml. normal solution of titanium sulfate 15 ml. of a normal solution of magnesium chloride are employed;

(b) 15 ml. of a normal solution of sodium meta-antimonite and 1 litre of a 1% solution of potassium-octyl-cetyl-naphthalene sulfonate, and instead of the normal solution of titanium sulfate 25 ml. of a normal solution of barium chloride are employed;

(c) 5 ml. of a normal solution of potassium hexahydroxo antimonate and 500 ml. of a 2% solution of cetyl sodium phosphate are employed;

(d) 20 ml. of a normal solution of sodium tetraborate and 500 ml. of a 2% solution of dodecyl ammonium citrate, and instead of the 15 ml. normal solution of titanium sulfate 30 ml. of a normal solution of calcium chloride are employed.

*Example 3*

One proceeds as described in Example 1 or 2 but instead of titanium dioxide
 (a) Zinc oxide;
 (b) Red iron oxide;
 (c) Yellow iron oxide;
 (d) Black iron oxide;
 (e) Antimony oxide;
 (f) Bauxite red are used.

*Example 4*

500 g. of minimum ($Pb_3O_4$) are suspended in 2 litres of water, and while intensively stirring 5 ml. of a normal solution of sodium aluminate and 5 ml. of a normal solution of sodium tetraborate, then 10 ml. of a normal solution of calcium chloride and 10 ml. of a normal solution of barium chloride are added. After intensively stirring for some minutes, 500 ml. of a 1% solution having a temperature of 60° to 80° C. of ammonium stearate are added. The precipitated substance is stirred further for 15 minutes, then filtered, washed with water 1 to 2 times, then dried until free from water and disintegrated. The minimum thus obtained has hydrophobic properties and it is can be easily dispersed in binding materials by simple stirring.

*Example 5*

One proceeds as described in Example 1 or 2 but instead titanium dioxide chromium oxide green ($Cr_2O_3$), instead of the solution of sodium tetraborate a solution of sodium arsenite, and instead of the solution of titanium sulfate 10 ml. of a normal solution of chromic chloride and 5 ml. of a normal solution of copper sulfate are used.

*Example 6*

500 g. of barium sulfate containing particles up to 20 micons are suspended in 2 litres of distilled water. While intensively stirring 20 ml. of a normal solution of sodium zincate and then 500 ml. of a 1% solution of monobutyl ammonium phthalate are added. After stirring further for 5 minutes, 35 ml. of a normal solution of calcium chloride are added. After stirring for 20 minutes, the suspension is filtered, washed once with water, dried at 80 to 140° C. and then disintegrated. The hydrophobic barium sulfate thus obtained can be very easily dispersed in synthetic materials, e.g. in polyvinyl chloride.

*Example 7*

One proceeds as described in Example 6 with the difference that instead of barium sulfate
 (a) Lithopone;
 (b) Calcium sulfate;
 (c) Lead sulfate;
 (d) Strontium sulfate are used.

*Example 8*

500 g. of precipitated calcium carbonate are suspended in 2 litres of distilled water. While intensively stirring 1000 g. of a 1% solution of dioctyl ammonium trimellitate and 10 ml. of a normal solution of aluminum sulfate are added. After intensively stirring for 20 minutes, the precipitate is filtered, washed once and dried at 80 to 140° C., then the substance to be easily granulated is disintegrated.

The organophilic calcium carbonate obtained in this way can be very easily dispersed in synthetic materials, such as in polyethylene, polystyrene, polyvinyl chloride and solutions of synthetic resins for the lacquer industry, its dispersion is stable, and the laminar or fibrillar systems prepared from its dispersion are uniform and compact, consequently they have a highly improved water-tightness as well as physical and chemical resistivities.

In similar way, organophilic pigments can be prepared from the other carbonate pigments as well.

Example 9

500 g. of finely ground apatite (3 $Ca_3/Po_4/_2.CaF_2$) having particles up to 10 microns are suspended in 2 litres of distilled water. While intensively stirring 800 g. of a 1% solution of the sodium salt of decylene-bisdiol-boric acid ester prepared from decylene glycol-(1,2) and boric acid are added. After intensively stirring for 20 minutes, the precipitated substance is filtered, dried at 70 to 100° C. until free from water, and then disintegrated.

Organophilic phosphate pigments can be prepared in similar ways from other phosphate pigments as well. One can proceed according to any of the preceding examples too, thus obtaining similar results.

Example 10

500 g. of lead chromate ($PBCrO_4$) are suspended in 2 litres of water, then while intensively stirring 25 ml. of a normal solution of calcium chloride and 1000 g. of a 1% aqueous solution having a temperature of 60 to 70° C. of the ammonium salt of p-dodecyl benzoic acid are added. After intensively stirring for 20 minutes, the precipitated substance is filtered, washed twice with water, then dried at 100 to 140° C. until free from water and disintegrated.

Example 11

One proceeds as described in Example 10 with the difference that instead of the 1% solution of ammonium-p-dodecyl-benzoate (a) A 1% aqueous solution of the sodium salt of monolauryl ester of hydroxy succinic acid is used;

(b) A 1% aqueous solution of the ammonium salt of dioctyl aconitic acid is used;

(c) A 0.5% aqueous solution of the ammonium salt of monodecyl diphenic acid is used;

(d) A 0.5% aqueous solution of the sodium salt of N-dilauryl phthalic acid, and instead of the normal solution of calcium chloride 15 ml. of a normal solution of lead nitrate are used;

(e) A 0.5% aqueous solution of monooctyl ammonium homophthalate, and instead of the normal solution of calcium chloride 15 ml. of a normal solution of cadmium chloride are used.

Example 12

One proceeds in the manner described in Example 10 or 11, but instead of the lead chromate (a) Strontium chromate, and instead of the normal solution of calcium chloride a normal solution of ferric sulfate is used;

(b) Zinc chromate, and instead of the normal solution of calcium chloride a normal solution of stannic chloride is used;

(c) Barium chromate is used.

Example 13

To 1000 g. of a 5% suspension of freshly precipitated and washed Berlin blue 1000 g. of 1% aqueous suspension having a temperature of 50 to 60° C. of monooctyl ammonium hexachloro endomethylene tetrahydrophthalate and 30 ml. of a normal solution of aluminum sulfate are added while intensively stirring. After 15 minutes the precipitated substance is filtered, washed once with water, dried at 100 to 140° C. until free from water and then disintegrated.

The dried substance can be very easily ground, has hydrophobic properties, can be easily dispersed in polyvinyl chloride, giving a stable suspension in the polyvinyl chloride.

Example 14

One proceeds as described in Example 13 with the difference that instead of the solution of monooctyl ammonium hexachloro endomethylene tetrahydro phthalate (a) A solution of monolauryl ammonium phthalate, and instead of the normal solution of aluminum sulfate a normal solution of nickelous sulfate is used in identical amount and concentration. The Berlin blue thus prepared can be very easily dispersed especially in polyethylene;

(b) A 1% solution of butyl stearyl potassium pyromellitate used. The organophilic Berlin blue thus obtained can be extremely easily dispersed especially in polyurethane synthetic materials and in synthetic resin solutions for the lacquer industry;

(c) The aqueous solution of the potassium salt of N-octyl phthalic amide is used in identical amount and concentration. The organophilic Berlin blue thus obtained can be extremely easily dispersed especially in polyamide synthetic materials.

Example 15

500 g. of finely ground cadmium sulfide having positive charges (that is precipitated in an aqueous suspension, in the presence of an excess of cadmium ions) are suspended in 2 litres of water. While intensively stirring 15 ml. of a normal solution of calcium chloride and 500 ml. of a 1% aqueous solution having a temperature of 60 to 70° C. of cetyl ammonium phthalate are added. After 20 minutes of intensive stirring the precipitated substance is filtered, dried at 80 to 100° C. until free from water, and then disintegrated.

The product obtained is a pigment having hydrophobic properties which can be easily dispersed in polyvinyl chloride, polystyrene, and polyethylene; its colouring power is improved by 20–25%. It is able to form compact and uniform laminar or fibrillar systems of high brilliance. It can be similarly employed in synthetic resin solutions for the lacquer industry as well.

Example 16

One proceeds as described in Example 15 with the difference that instead of the normal solution of calcium chloride and the 1% solution of octyl ammonium phthalate (a) A 1% solution of lauryl ammonium phthalate and a normal solution of aluminum sulfate is used;

(b) A 1% solution of dioctyl ammonium trimellitate and a normal solution of aluminum sulfate is employed;

(c) A 1% solution of dioctadecyl ammonium trimellitate and a normal solution of aluminum sulfate is used;

(d) A 1% solution of octyl ammonium hexachloro endomethylene tetrahydrophthalate and a normal solution of aluminum sulfate is used;

(e) A 1% solution of the ammonium salt of N-octyl phthalic amide and a normal solution of aluminum sulfate is used.

Example 17

One proceeds in the way described in Example 15 or 16, but instead of the ammonium salts, sodium or potassium salts are used, and instead of the cadmium sulfide having positive charges (a) mercury sulfide having positive charges is employed;

(b) cadmium sulfide selenide having positive charges is employed;

(c) Tin sulfide having positive charges is employed;

(d) Zinc sulfide having positive charges is employed;

(e) Anitomony sulfide having positive charges is employed;

(f) Arsenic sulfide having positive charges is employed.

Example 18

500 g. of barium sulfate having negative charges (that is precipitated in the presence of an excess of sulfate ions) are suspended in 2 litres of distilled water. While intensively stirring, 10 ml. of a normal solution of sodium tetraborate, then 1 litre of 1% solution having a temperature of 60 to 70° C. of dioctadecyl dimethyl ammonium chloride is added. After a further 10 minutes of intensive stirring 15 ml. of a normal solution of manganous sulfate are added. The precipitated substance is filtered, washed with water, dried at 100 to 120° C. until free from water, then disintegrated. The organophilic barium sulfate prepared in this way has excellent organophilic properties; it can easily be dispersed in synthetic materials, e.g. in polyvinyl chloride.

*Example 19*

One proceeds as described in Example 18, but instead of the solution of dioctadecyl dimethyl ammonium chloride (a) A 1% solution of cetyl methylene ether pyridinium bromide is used;

(b) A 0.5% solution of triphenyl dodecyl phosphonium bromide is used;

(c) A 1% solution of dimethyl dioctadecyl arsonium iodide is used;

(d) A 2% solution of didodecyl ethyl sulfonium bromide is used.

*Example 20*

One proceeds in the way described in Example 18 or 19 but instead of the barium sulfate having negative charges the following sulfide pigments having negative charges, that is prepared in the presence of an excess of sulfide ions, are used;

(a) Cadmium sulfide;
(b) Cadmium sulfide selenide;
(c) Mercury sulfide;
(d) Tin sulfide;
(e) Zinc sulfide;
(f) Antimony sulfide;
(g) Arsenic sulfide.

*Example 21*

500 g. of cobalt violet $(Co_3/PO_4/_2)$ are suspended in 2 litres of water. While intensively stirring, 15 ml. of a normal solution of sodium arsenate, 15 ml. of a normal solution of sodium arsenite, 1 litre of a 1% solution having a temperature of 60 to 70° C. of dilauryl sodium pyrophosphate, 25 ml. of a normal solution of cobaltous chloride, and 25 ml. of a normal solution of ferric sulfate are added. After intensively stirring for 20 minutes, the precipitate is filtered, washed with water, dried at 120 to 150° C. until free from water, and then disintegrated.

*Example 22*

500 g. of ultramarine blue are suspended in 2 litres of water, then while intensively stirring 20 ml. of a normal solution of sodium arsenate, 500 ml. of a 1% solution having a temperature of 60 to 70° C. of dicetyl ammonium trimellitate, 10 ml. of a normal solution of zinc sulfate, and 25 ml. of a normal solution of cobalt sulfate are added. After intensively stirring for 20 minutes, the precipitate is filtered, washed with water, dried at 120 to 150° C. until free from water, and then disintegrated.

*Example 23*

500 g. of molybdenum red

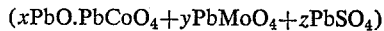
$(xPbO.PbCoO_4 + yPbMoO_4 + zPbSO_4)$ are suspended in 2 litres of water. While intensively stirring, 15 ml. of a normal solution of potassium hexahydroxo antimonate, 5 ml. of a normal solution of sodium arsenate, 20 ml. of a normal solution of barium chloride, 10 ml. of a normal solution of strontium chloride and 500 ml. of a 1% solution having a temperature of 50 to 60° C. of monoglycol chlorohydrine ammonium naphthalate are added. After intensively stirring for 20 minutes, the precipitate obtained is filtered, washed with water, dried at 130° C. and then disintegrated.

*Example 24*

500 g. of "Hansa yellow" prepared by reacting N-nitro-p-toluidine and acetanilide are suspended in 2 litres of distilled water. While intensively stirring, 40 ml. of a normal solution of sodium arsenate, 20 ml. of a normal solution of mercury nitrate, 30 ml. of a normal solution of nickel sulfate, and 1 litre of a 1% solution of dioctadecyl ammonium trimellitate are added. After intensively stirring for 20 minutes, the precipitate is filtered, washed with water, dried at 80 to 120° C. until free from water, and then disintegrated.

*Example 25*

One proceeds as described in Example 24, but instead of "Hansa yellow"

(a) "Permanent red" prepared by reacting o-chloro-p-nitraniline and 3-naphthol is used in identical amount and concentration;

(b) "Benzidine yellow" (permanent yellow) prepared by reacting cidhloro benzidine and acetylaceto-m-xylidide is used in identical amount and concentration;

(c) "Benzidine orange" (permanent orange) prepared by reacting dichloro benzidine and phenyl methyl pyrazolone is used in identical amount and concentration;

(d) "Heliored RMT extra" prepared by reacting m-toluidine-o-sulfonic acid and 3-naphthol is used in identical amount and concentration;

(e) "Helio Bordeaux BL" prepared by reacting α-naphthylamine and 1-naphthol-5-sulfonic acid is used in identical amount and concentration;

(f) "Permanent Bordeaux FRE" prepared by reacting m-nitro-o-toluidine and 3-oxynaphthoyl-o-toluidide is used in identical amount and concentration.

*Example 26*

500 g. of phthalocyanine blue ("Heliogene blue B") are suspended in 2 litres of distilled water. While intensively stirring, 80 ml. of a normal solution of potassium arsenite, 100 ml. of a normal solution of cobalt chloride, 1000 g. of a 1% solution of dicetyl ammonium trimellitate, and 500 ml. of a 1% solution of ammonium caprylate are added. After intensively stirring for 20 minutes, the precipitate is filtered, washed with water, then dried at 80 to 130° C. and disintegrated.

*Example 27*

One proceeds as described in Example 26 with the difference that instead of the phthalocyanine blue, phthalocyanine green (Heliogene green C), and instead of the normal solution of cobalt chloride 80 ml. of a normal solution of copper sulfate and 20 ml. of a normal solution of cadmium sulfate are used.

The process according to the invention renders possible for the first time the preparation of organophilic inorganic and organic pigments which are easily wetted equally by organic solvents, lacquers and the most different synthetic materials. Not only can the pigments prepared in this way be readily dispersed, but also the dispersions thus obtained are extremely stable. Consequently, the pigment and the binding material form a firm, closed unit, and the water-proofness, weather-proofness and chemical and physical resistivities of the laminar or fibrillar systems prepared therefrom are improved in a high degree.

The synthetic material systems pigmented with the organophilic pigments prepared by the process according to the invention show, under the influence of heat treatment, a change in colour and lustre only in a slight degree. Due to the good wettability of the pigment, these systems maintain their fluidity even in the case of a higher pigment concentration, the result of which is a higher elasticity and higher lustre in case of identical concentrations; this ensures better susceptibility to application and to being brushed.

The covering and colouring powers of the system containing pigments prepared by the process according to the invention are also improved which is primarily due to the fact that the dispersibility of the organophilic pigments thus prepared is much greater than that of the non-organophilic pigments prepared under similar circumstances. In the pigments organophilized according to the invention a recrystallization process due to adhesion, the result of which would be the "roughening" of the pigments, does not occur during storage. When worked into different synthetic materials, the phenomenon of "swimming out" and "bleeding" do not occur.

The anion-active and cation-active agents usable in compliance with the process according to the invention are suitable to form pigment surfaces having the most varied structures, whereby the preparation of pigments having surface properties best corresponding to the properties of the organic solvent, lacquer or synthetic material used becomes possible.

The process according to the invention can be equally employed not only in the case of inorganic pigments but also in the case of those organic pigments which, in spite of their organic character, can be dispersed only with difficulty in many organic binding materials and give no stable dispersion.

What we claim is:

1. A process for treating pigments to impart to them improved dispersibility in organic solvents, lacquers and synthetic materials, said pigments having positive surface charges when dispersed in water, which comprises forming in an aqueous medium a dispersion of the pigment to be treated, then incorporating into said dispersion a 1 to 5% aqueous solution of 0.1 to 30% by weight, based on the pigment weight, of a first member selected from the group consisting of alkali and ammonium salts of saturated, unsaturated and polymerized aliphatic, arylated aliphatic, aromatic and hydroaromatic carboxylic acids containing at least 6 carbon atoms, alkyl- aryl- and mixed alkyl-aryl sulfonates, sulfates, phosphates and polyphosphates, the condensation products of alkyloxy-, aryloxy- and amino-sulfonic acids with fatty acids containing from 8 to 18 carbon atoms, the sulfonated derivatives of condensation products of fatty acids containing from 8 to 18 carbon atoms with aromatic diamines, the semiesters and N-alkylsemiamide derivatives of aliphatic, arylated aliphatic, aromatic and hydroaromatic polycarboxylic acids, alkoxo acids of alkyl borates, and mixtures thereof, incorporating into said dispersion a 0.1 to 2 N aqueous solution containing 0.05 to 5% by weight, based on the pigment weight of a second member selected from the group consisting of boric acid, alkali borates, alkali stannates, alkali antimonites, alkali antimonates, alkali arsenites, alkali arsenates, alkali aluminates, alkali zincates, alkali plumbites, alkali chromites, and mixtures thereof, incorporating into said dispersion a 0.1 to 2 N aqueous solution of 1 to 2 equivalents, based on the amount of said second member, of salts soluble in water of cations selected from the group consisting of lead, mercury, copper, cadmium, divalent tin, cobalt, nickel, divalent iron, zinc, manganese, magnesium, calcium, strontium, barium, trivalent iron, chromium, aluminum, tetravalent tin, titanium and mixtures thereof, and thereafter separating the pigment from said aqueous medium.

2. A process for treating pigments to impart to them improved dispersibility in organic solvents, lacquers and synthetic materials, said pigments having negative surface charges when dispersed in water, which comprises forming in an aqueous medium a dispersion of the pigment to be treated, then incorporating into said dispersion a 1 to 5% by weight aqueous solution containing 0.1 to 30% by weight, based on the pigment weight, of a halogen salt soluble in water organic quaternary -onium and -inium bases containing an alkyl substituent having from 8 to 18 carbon atoms, incorporating into said dispersion a 0.1 to 2 N aqueous solution of 0.05 to 5% by weight, based on the pigment weight, of a member selected from the group consisting of boric acid, alkali borates, alkali stannates, alkali antimonites, alkali antimonates, alkali arsenites, alkali arsenates, alkali aluminates, alkali zincates, alkali plumbites, alkali chromites, and mixtures thereof, incorporating into said dispersion a 0.1 to 2 N aqeous solution of 1 to 2 equivalents, based on the amount of said member, of salts soluble in water of cations selected from the group consisting of lead, mercury, copper, cadmium, divalent tin, cobalt, nickel, divalent iron, zinc, manganese, magnesium, calcium, strontium, barium, trivalent iron, chromium, aluminum, tetravalent tin, titanium, and mixtures thereof, and thereafter separating the pigment from said aqueous medium.

References Cited

UNITED STATES PATENTS 3,025,179  3/1962  Holbein _____ 106—308

TOBIAS E. LEVOW, *Primary Examiner.*

JAMES E. POER, *Examiner.*